(12) United States Patent
Pfeffer et al.

(10) Patent No.: US 8,412,814 B2
(45) Date of Patent: Apr. 2, 2013

(54) SYSTEM AND METHOD FOR MANAGING THE DELIVERY OF TARGETED CONTENT

(75) Inventors: Howard Pfeffer, Reston, VA (US); Peter Stern, Riverside, CT (US); Michael Dillon, Aldie, VA (US)

(73) Assignee: Time Warner Cable, Inc., New York, NY (US)

( * ) Notice: Subject to any disclaimer, the term of this patent is extended or adjusted under 35 U.S.C. 154(b) by 539 days.

(21) Appl. No.: 12/718,346

(22) Filed: Mar. 5, 2010

(65) Prior Publication Data

US 2011/0219110 A1 Sep. 8, 2011

(51) Int. Cl.
*G06F 15/16* (2006.01)
*G06F 3/01* (2006.01)
*G06Q 30/02* (2012.01)

(52) U.S. Cl. .................. 709/224; 715/745; 705/14.49

(58) Field of Classification Search .......... 709/217, 709/219, 203, 224; 715/205, 745; 705/10, 705/14.49; 726/7; 455/456.3
See application file for complete search history.

(56) References Cited

U.S. PATENT DOCUMENTS

| | | | |
|---|---|---|---|
| 2008/0147480 A1* | 6/2008 | Sarma et al. | 705/10 |
| 2009/0247193 A1* | 10/2009 | Kalavade | 455/456.3 |
| 2010/0153516 A1* | 6/2010 | Weinberg et al. | 709/217 |
| 2010/0180013 A1* | 7/2010 | Shkedi | 709/219 |
| 2010/0241687 A1* | 9/2010 | Shein et al. | 709/203 |
| 2011/0191664 A1* | 8/2011 | Sheleheda et al. | 715/205 |
| 2011/0265169 A1* | 10/2011 | Bauer-Hermann et al. | 726/7 |

* cited by examiner

*Primary Examiner* — Jungwon Chang
(74) *Attorney, Agent, or Firm* — The Marbury Law Group, PLLC

(57) ABSTRACT

A system and method for managing the delivery of targeted content. When a user desires to opt-out of receiving targeted content, the user registers with a do-not-target (DNT) registry and is issued a DNT cookie. The DNT cookie is a domain cookie that is stored on a user network access device. A provider of targeted content may look for the DNT cookie stored on the user's network access device. When the DNT cookie is not found, then the provider may deliver targeted content to the user. When the DNT cookie is found, then the provider may not deliver targeted content to the user. A Web site may offer the user an "override" cookie that allows that Web site to provide targeted content, or selected targeted content, even when the user has a DNT cookie. Alternatively, a DNT header can be added to a Web page request that indicates that the user does not want to receive targeted content. The DNT header may be overridden by an override cookie.

31 Claims, 6 Drawing Sheets

SYSTEM AND METHOD FOR MANAGING THE DELIVERY OF TARGETED CONTENT

BACKGROUND

Surfing the Web, whether for information, products or just to pass the time, has become a part of daily life. While a user is browsing websites, it is virtually certain that the user will encounter a "cookie." A cookie is a piece of text that a Web server can store on the user's hard disk. Cookies allow the Web site to store information on a user's machine and later retrieve it. The pieces of information are stored as name-value pairs. A name-value pair is simply a named piece of data. A Web site can retrieve only the information that it has placed on a particular network access device. It cannot retrieve cookies placed by others on that access device.

There is nothing inherently nefarious about the use of cookies. The information in a cookie makes it possible for Web sites to assess their traffic and to customize their sites for repeat visitors. A cookie may be used to track a user's habits and to determine his or her preferences for various purposes. For example, a tracking cookie may be used by a server to capture information about a user's interests. A user profile may then be created and used to targeted content to the user. The content may be an offer for a particular product or a link to an article about a subject of interest.

A user may find the tracking of his or her browsing habits intrusive or helpful depending on the user's sensitivity to privacy issues, on how the tracking information is used, and whether the tracking is done surreptitiously or with the permission of the user.

Typically, when a user requests a page from a Web server, the server looks at the request headers to determine if a cookie is present. If the cookie is not present, the server creates a cookie identifier and sends it as a cookie back to the Web client application (sometimes referred to as a "browser") together with the requested page. From this point on, the cookie will be automatically sent by the Web client application to the server every time a new page from the site is requested. The server sends the page as usual, but also stores the URL of the requested page, the date/time of the request, and the cookie in a log file. By looking at a log file, it is then possible to find out which pages the user has visited and in what sequence using the cookie identifier. The URL and date/time stored with the cookie allows for finding out which pages the user has visited, and at what time.

Some objects of a Web page may not be stored on the server that hosts the requested page. Rather, certain objects may reside on different servers each object potentially with its own cookie. If the servers are outside the domain of the requested Web page, the cookie is referred to as a domain cookie. When a Web client application requests a Web page, the Web client application receives the HTML code that includes location information indicating where objects located. The Web client application issues "GET" commands to these locations. When responses to all of the GET commands have been received, the Web client application displays the page.

For example, on-line advertising may be provided through third party servers. A GET command will be issued to retrieve the ads from the third party servers. The hosts of these ads may provide cookies with the ads. The cookies in this example may be used to track a user's behavior at the original host site and across different Web sites that are linked to the third party servers.

As noted previously, cookies may be used to create an anonymous profile of the user. This allows a website to select content to show to a user based on the user's profile. When this content is advertising or other material that is pushed on the user, the user may desire to exercise control over the use of tracking cookies.

Tools are available in Web client applications to allow a user to manage cookies. A user may configure a Web client application to block cookies outside the domain of a requested Web page. However, a number of popular functions depend on domain cookies being enabled. For example, shopping carts and on-line bill paying sites use domain cookies to provide security. Additionally, if a service provider embeds a login page from an identity provider through an iFrame the cookies used by the identity provider would be considered a domain cookie. This is due to the fact that the URL in the browser does not reflect the URL from where the cookies are being sent back to the client browser.

To address privacy issues, advertisers have individually and collectively provided opt-out mechanisms that allow users to choose not to be tracked for advertising purposes. However, these mechanisms are offered in a piece-meal fashion that requires users to opt-out of tracking at multiple sites. The burden is on the user to find the link to the opt-out site, complete the information at each site, and follow various rules for maintaining the opt-out state. The opt-out state may have to be renewed from time-to-time and may be negated by system management activities that routinely clear cookies.

SUMMARY

Embodiments herein are directed to systems and methods for providing a central Do Not Target (DNT) Registry that may be used in conjunction with a DNT cookie to allow a user to "opt-out" of receiving targeted content from Web pages.

In an embodiment, a DNT Registry is accessible to a user device operated by a user through a website. For example, the website may be assigned a domain of DNT.ORG. A provider of targeted content may create a subdomain under the DNT.ORG domain. For example, "site.com" would create a sub domain "site.DNT.ORG." When a user desires to opt-out of receiving targeted content, the user registers with the DNT website and is issued a DNT domain cookie. The DNT domain cookie is stored on the user device.

Because a provider of targeted content has a subdomain under the DNT.ORG domain, the provider of targeted content may embed script into its pages that looks for the DNT cookie stored on the user's network access device. When the DNT domain cookie is not found, then the provider may deliver targeted content to the Web client application operated by the user. When the DNT domain cookie is found, then the provider may not deliver targeted content to the Web client application operated by the user.

DETAILED DISCLOSURE

As used herein "targeted content" encompasses content that is delivered based on a profile associated with a user or network access device. The content may include text, video, audio or images. Targeted content may be classified by type depending on the purpose of the content. By way of illustration and not by way of limitation, the content may be provided to inform the user (e.g., an new article), to acquire information from the user (e.g., a survey), to engage in a financial transaction (e.g., an advertisement to purchase or lease goods or to contract for services), to join a group (e.g., a social networking site, a political party), or to take an action (e.g., to vote for a candidate, to sign a petition).

A "user network access device" encompasses processor-based devices that may access the Internet via a wired or wireless interface and that operate software that allows the user network access device to interact with Web servers. By way of illustration and not by way of limitation, a user network access device may be a desktop computer, a laptop computer, a set top box, a PDA, a smart phone, a WAP-enabled device, or any other device configured to operate a Web client application.

Figure 1:
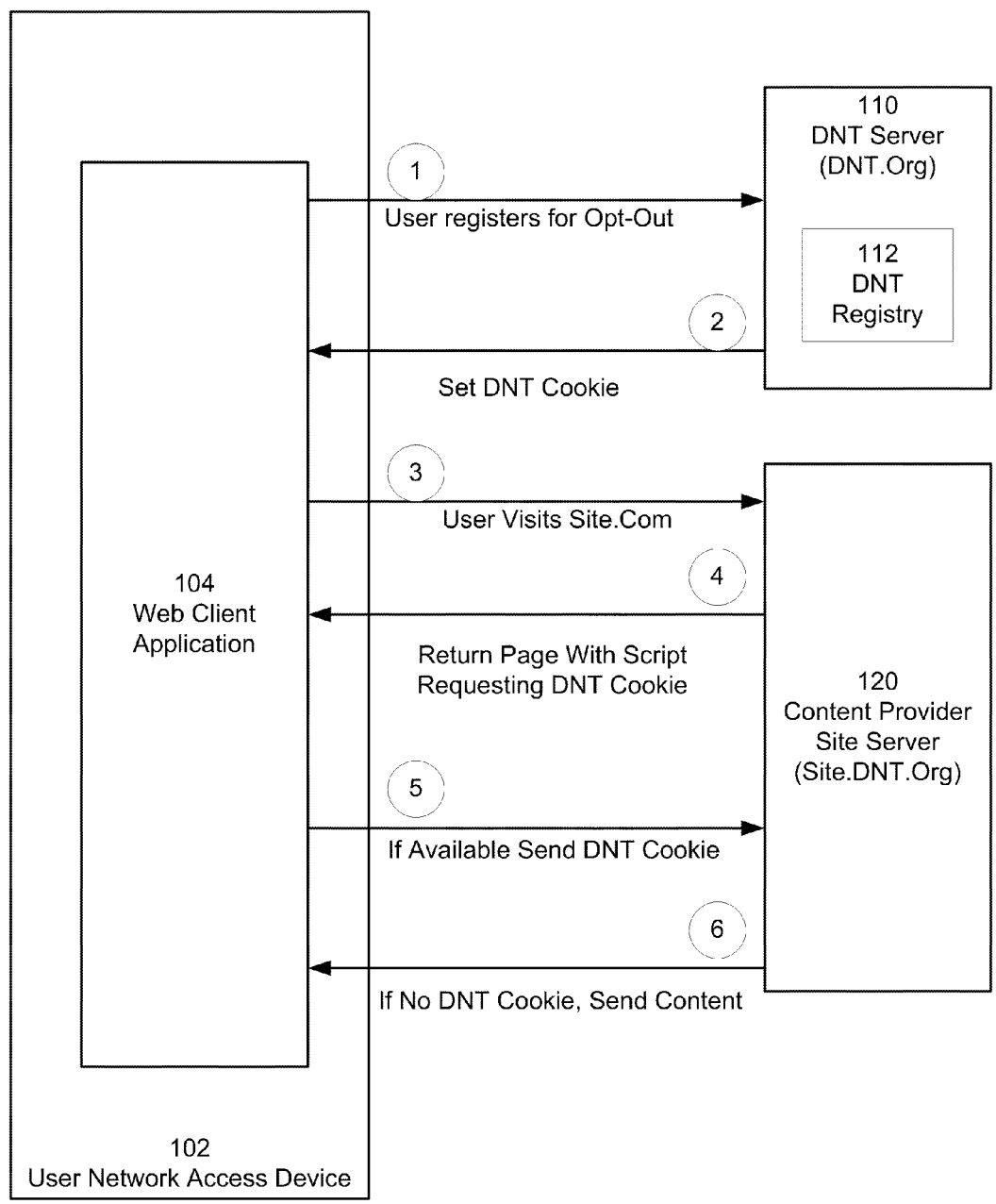
FIG. 1 is a flow diagram illustrating the use of a domain cookie to enforce a decision by a user to opt-out from receiving targeted content according to an embodiment.

FIG. 1 is a flow diagram illustrating the use of a domain cookie to enforce a decision by a user to opt-out from receiving targeted content according to an embodiment. In an embodiment, a user operates a network access device 102 that includes a Web client application 104. The Web client application 104 navigates to a website operated on a DNT server 110 and ultimately to a page that is configured to receive a request from the user of the Web client application 104 to opt-out from receiving targeted content from participating content providers. By way of illustration and not by way of limitation, the DNT server 110 may be assigned the domain DNT.ORG.

As described above, a participating content provider creates a subdomain under the DNT.ORG domain. In an embodiment, the participation of content providers is mandated by a regulatory authority. In this embodiment, the opt-out registration is universal within the authority of the regulatory authority.

The user registers with the DNT Registry 112 (circle 1) and receives a DNT cookie (circle 2).

The user visits site.com and requests a Web page (circle 3). In this embodiment, site.com provides targeted content from its own server and hosts links to third-party content providers. The code for the requested Web page is served from the site.DNT.ORG subdomain established by the content provider to Web client application 104 (circle 4). The code may include a script embedded on the page served by site.DNT.ORG that looks for the DNT cookie stored on the user's network access device 102. When the DNT cookie is found, it is returned to site.DNT.ORG and site.com may not deliver targeted content to the Web client application operated by the user (circle 5). When the DNT cookie is not found, then the provider may deliver targeted content to the Web client application operated by the user (circle 6).

The Web page served by the site.DNT.ORG subdomain may include a link to a site operated by a third-party. The Web client application 104 will send a GET command to the location identified in the link to retrieve the content stored at the third-party's site. If the third party is a provider of targeted content, the third party's site will also have established a subdomain under the DNT.ORG domain. For example, thirdparty.com would establish a subdomain "thirdparty.DNT.ORG." The response to the GET command would be served from this subdomain and would include a script that looks for the DNT cookie stored on the user's network access device 102. When the DNT cookie is found, it is returned to thirdparty.DNT.ORG and thirdparty.com may not deliver targeted content to the Web client application operated by the user (circle 5). When the DNT cookie is not found, then thirdparty.com may deliver targeted content to the Web client application operated by the user (circle 6).

In an embodiment, targeted content must be identified in a manner that provides the user notice that he or she is receiving targeted content. In another embodiment, the targeted content includes a link to the DNT registry site. In this manner, a user may determine that his or her registration with the DNT registry is functioning as intended.

The Web page served by site.DNT.ORG subdomain may include a link to a site operated by a third-party. The Web client application 104 will send a GET command to the location identified in the link to retrieve the content stored at the third-party's site. If the third party is a provider of targeted content, the third party's site will also have established a subdomain under the DNT.ORG domain. For example, thirdparty.com would establish a subdomain "thirdparty.DNT.ORG." The response to the GET command would be served from this subdomain and would include a script that looks for the DNT cookie stored on the user's network access device 102. When the DNT cookie is found, it is returned to thirdparty.DNT.ORG and thirdparty.com may not deliver targeted content to the Web client application operated by the user (circle 5). When the DNT cookie is not found, then thirdparty.com may deliver targeted content to the Web client application operated by the user (circle 6).

As previously discussed, a user may not want to preclude the delivery of targeted content from all content providers. In an embodiment, a provider of targeted content may offer a user a "DNT override" cookie. When a DNT cookie is found on the user's network access device 102, the targeted content provider may then look for a DNT override cookie. The presence of the DNT override cookie constitutes a grant of permission by the user for the particular content provider to provide targeted content to the user.

In an embodiment, the user's acceptance of a DNT override cookie may be limited to selected content. In this embodiment, the content provider may offer the user a list of content classifications provided by the content provider. The user may select content from the list that the user desires to receive and this content is identified in the DNT override cookie. The content provider will still be blocked from serving non-selected targeted content to the user's Web client application 104.

In an embodiment, the decision of a user to opt-out of receiving targeted content is communicated to a content provider in a message header.

Figure 2:
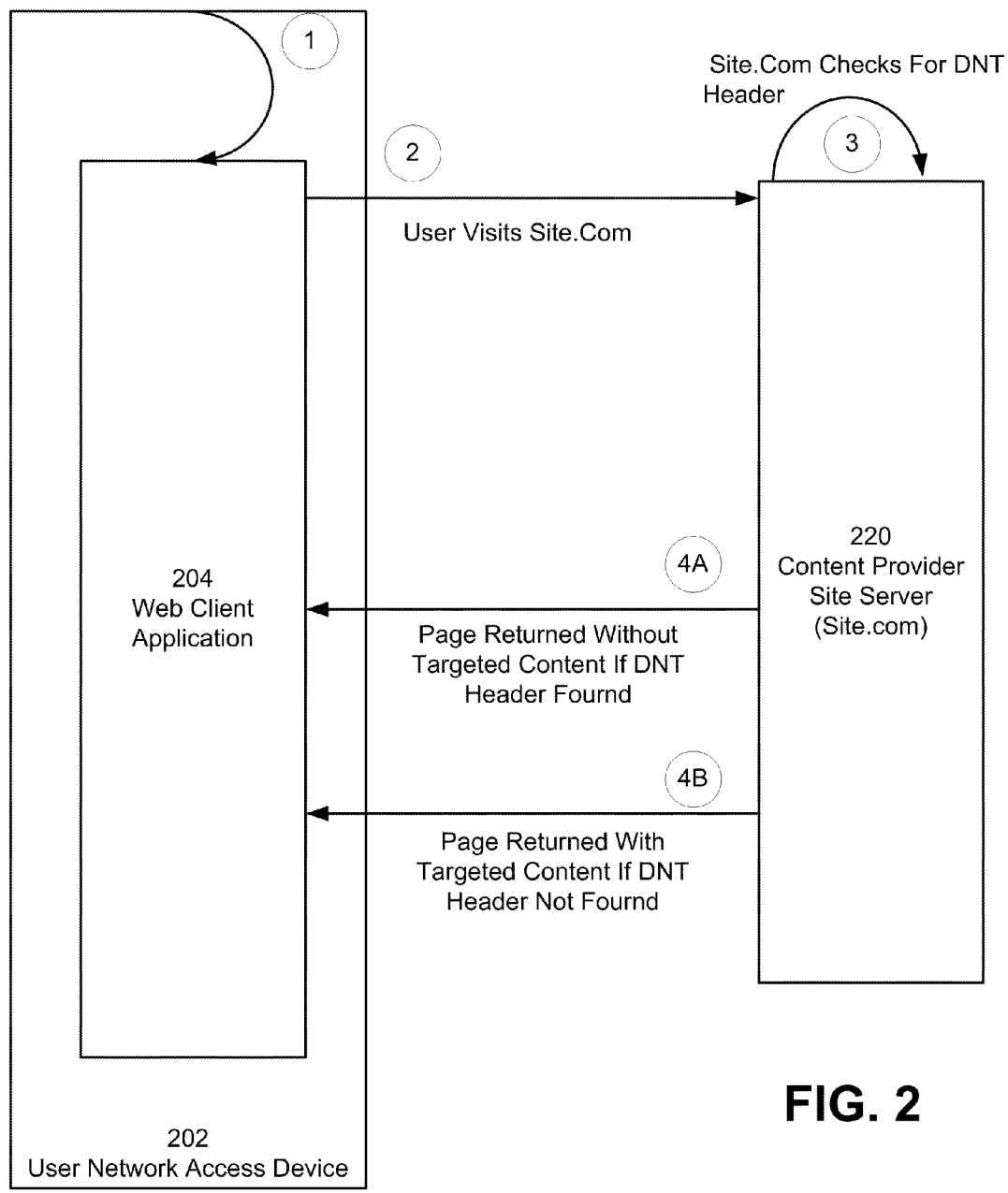
FIG. 2 is a flow diagram illustrating the use of a message header to communicate a decision by a user to opt-out of receiving targeted content according to an embodiment.

FIG. 2 is a flow diagram illustrating the use of a message header to communicate a decision by a user to opt-out of receiving targeted content according to an embodiment.

In an embodiment, Web client application 204 is configurable to allow a user of network access device 202 to opt-out of receiving targeted content (circle 1). The configuration of the Web client application 204 to opt-out of receiving targeted content enables a "DNT header" that conveys the configuration in a page request sent to a Web site, such as site.com (circle 2).

The Web server hosting site.com 220 checks the request from the presence of the DNT header. When the DNT header is present, the Web server 220 hosting the requested Web page will not deliver targeted content (circle 4A). When the DNT header is not present, the Web server 220 hosting the requested Web page may deliver targeted content (circle 4B).

The Web page served by site.com may include a link to a site operated by a third-party. The Web client application 204 will send a GET command to the location identified in the link to retrieve the content stored at the third-party's site. If the opt-out configuration has been enabled, the GET command will include the DNT header and the third party may not deliver targeted content to the Web client application operated by the user (circle 4A). The absence of the DNT header communicates to the third party that targeted content is permissible (circle 4B).

In an embodiment, the opt-out configuration of the Web client application 204 is exposed via a script so that it can be set by the site hosting a DNT Registry, such as DNT.ORG. The Web client application 204 would prompt the user before accepting the configuration setting.

In an embodiment, targeted content must be identified in a manner that provides the user notice that he or she is receiving targeted content. In another embodiment, the targeted content includes a link to the DNT registry site. In this manner, a user may determine that his or her registration with the DNT registry is functioning as intended.

As previously discussed, a user may not want to preclude the delivery of targeted content from all content providers. In an embodiment, a provider of targeted content may offer a user a "DNT override" cookie. When a request by a user's Web client application 204 includes the DNT header, the targeted content provider may then look for a DNT override cookie. The presence of the DNT override cookie constitutes a grant of permission by the user for the particular content provider to provide targeted content to the user.

In an embodiment, the user's acceptance of a DNT override cookie may be limited to selected content. In this embodiment, the content provider may offer the user a list of content classifications provided by the content provider. The user may select content from the list that the user desires to receive and this content is identified in the DNT override cookie. The content provider will still be blocked from serving non-selected targeted content to the user's Web client application 204.

In an embodiment, the decision of a user to opt-out of receiving targeted content is communicated to a proxy sever.

Figure 3:
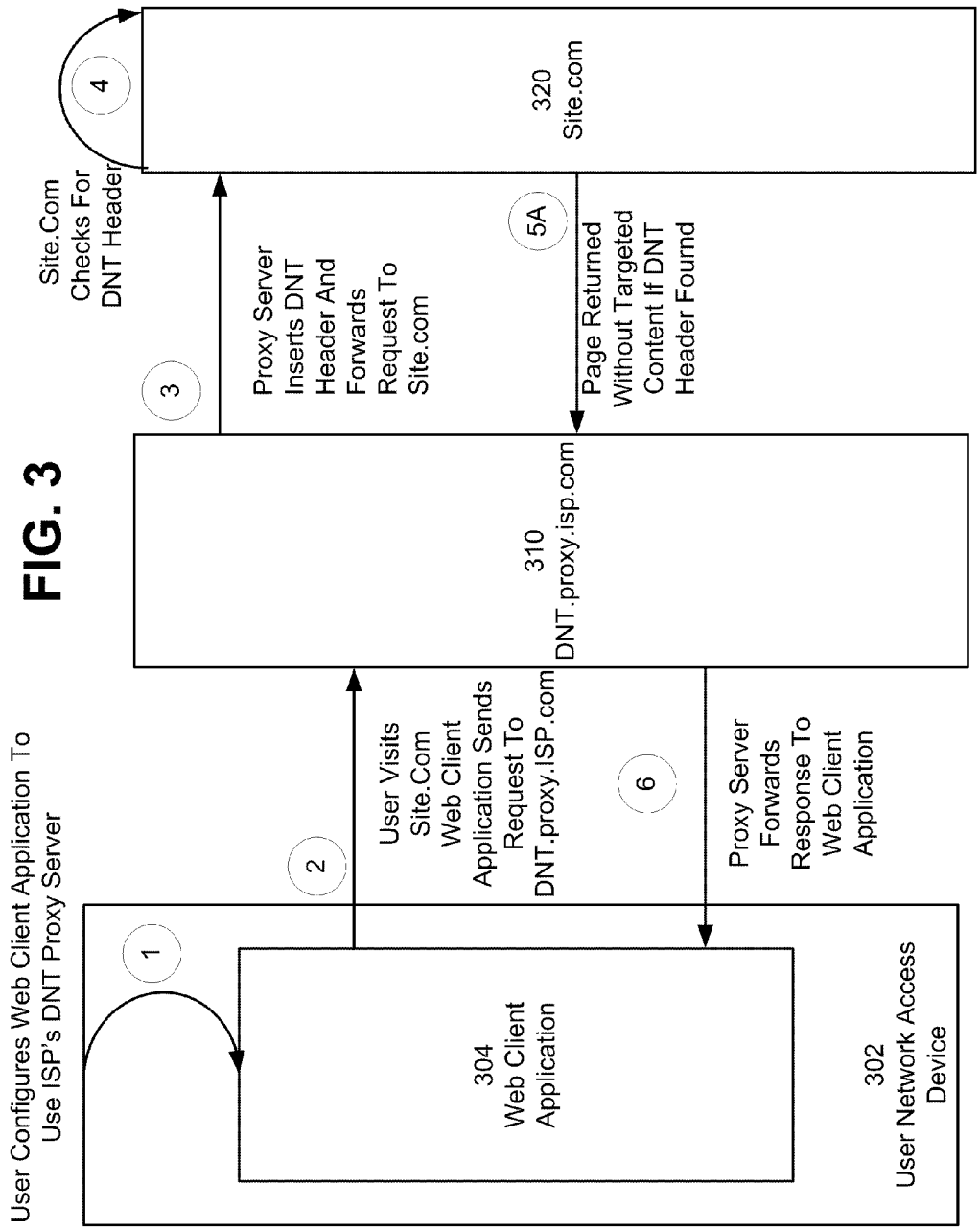
FIG. 3 is a flow diagram illustrating the use of a message header inserted by a proxy server to communicate a decision by a user to opt-out of receiving targeted content according to an embodiment.

FIG. 3 is a flow diagram illustrating the use of a message header inserted by a proxy server to communicate a decision by a user to opt-out of receiving targeted content according to an embodiment.

In an embodiment, Web client application 304 is configurable to allow a user of network access device 302 to opt-out of receiving targeted content (circle 1). The user who wants to opt out of receiving targeted content configures the Web client application to direct page requests to a proxy server operated by the user Internet Service Provider (ISP), such as the proxy server 310 of site.com (circle 2). The proxy server 310 inserts a DNT header in the request and forwards the request to the site.com server 320 (circle 3). The site.com Web server 320 checks the request from the presence of the DNT header (circle 4). When the DNT header is present, the Web server 320 hosting the requested Web page will not deliver targeted content (circle 5A). The proxy server 310 forwards the response to the Web client application 304 (circle 6).

Targeting content to users is not limited to the Web. Targeted content may be delivered to users of other services provided over the Internet, shared networks and private networks. For example, video services delivered over cable, satellite or the Internet may include targeted content based on profiles generated from subscriber's viewing habits. As with Web-based targeted content, video targeted content may raise privacy concerns with some subscribers.

In an embodiment, a recipient of video programming may opt out of receiving targeted video content.

Figure 4:
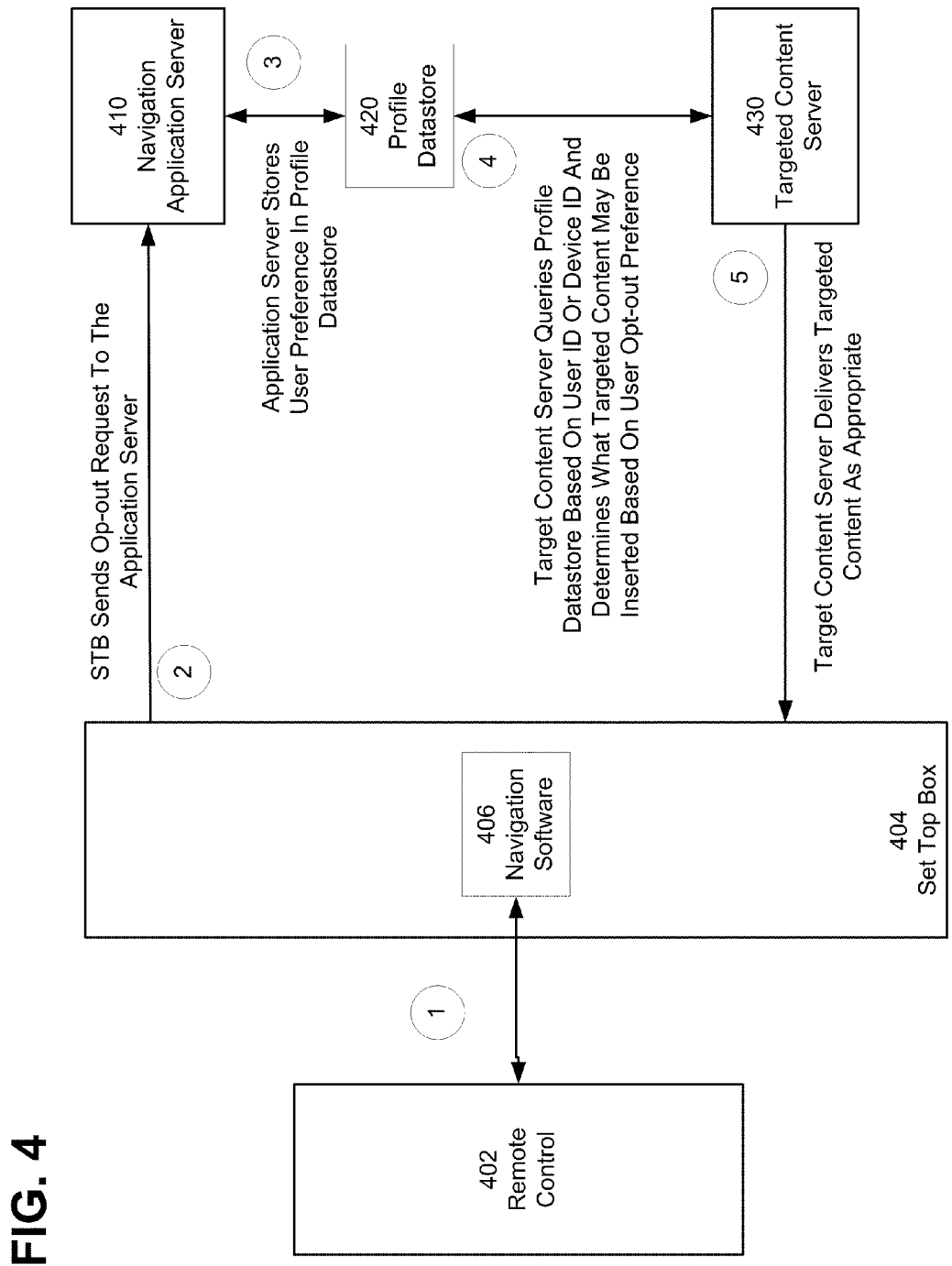
FIG. 4 is a flow diagram illustrating a process for communicating preferences relating to the receipt of targeted video content according to an embodiment.

FIG. 4 is a flow diagram illustrating a process for communicating preferences relating to the receipt of targeted video content according to an embodiment.

In an embodiment, a user accesses navigation software 406 operating on a set top box (STB) 404 using a remote control 402 (circle 1). The navigation software 406 directs the user to an interface (not illustrated) where the user may establish preferences that control the delivery of targeted content to the STB 404. In an embodiment, the user may block all targeted content or particular classes of targeted content. By way of illustration and not by way of limitation, a user may block targeted advertising but not targeted content that relates to a program selected by the user for viewing.

The user preferences are sent by the STB 404 to a navigation application server 410 (circle 2). The navigation application server 410 stores the user preferences in a profile datastore 420 in association with a user ID or an ID of the STB 404 (circle 3). When the user selects a program for viewing, the user and/or STB ID are provided to a targeted content server 430. The targeted content server 430 queries the profile datastore 420 based on the user ID or the device determines what targeted content may be inserted based on user opt-out preferences (circle 4). The targeted content server 430 delivers targeted content to STB 404 as appropriate based on the user's stored preferences.

In an embodiment, the establishment of the user's preferences (circles 1-3) is performed using a Web portal (not illustrated). In this embodiment, a user accesses the Web portal using a Web client application-based network access device (see, for example, FIG. 1, elements 102 and 104). The Web portal provides an interface through which the user may save his or her preferences to the profile datastore 410.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

Figure 5:
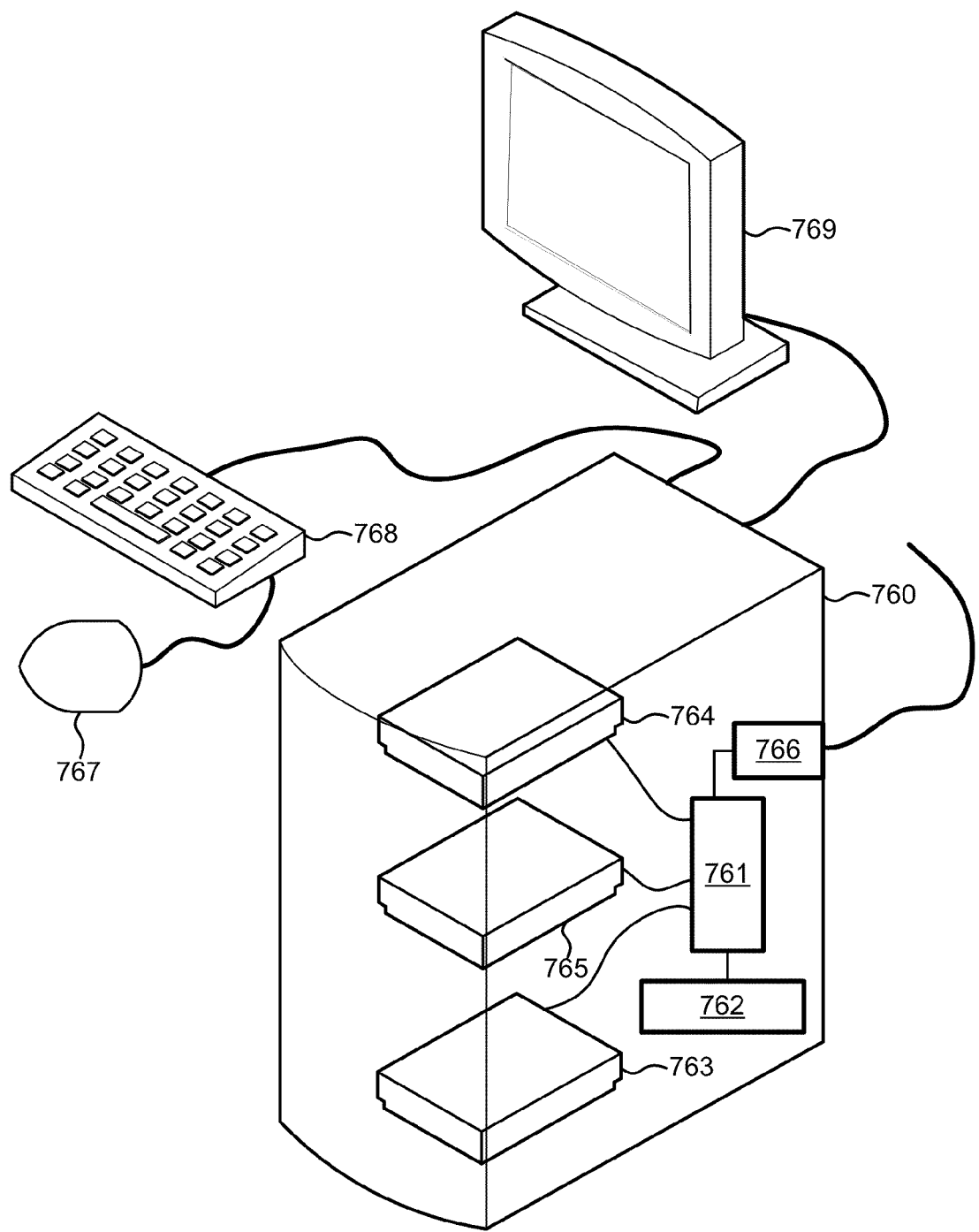
FIG. 5 is a component block diagram of a personal computer suitable for use in the various embodiments.

As used herein, the term "network access device" encompasses, for example, desktop computers, laptop computers and mobile devices and other processor-equipped devices that may be developed in the future that may be configured to permit a user to interact with other devices over a network. In one embodiment, a network access device 102 may be a personal computer. By way of illustration, the functional components of a personal computer 760 are illustrated in FIG. 5. Such a personal computer 760 typically includes a processor 761 coupled to volatile memory 762 and a large capacity nonvolatile memory, such as a disk drive 763. The computer 760 may also include a floppy disc drive 764 and a compact disc (CD) drive 765 coupled to the processor 761. Typically the computer device 760 will also include a pointing device such as a mouse 767, a user input device such as a keyboard 768 and a display 769. The computer device 760 may also include a number of connector ports coupled to the processor 761 for establishing data connections or receiving external memory devices, such as a USB or FireWire® connector sockets or other network connection circuits 766 for coupling the processor 761 to a network. In a notebook configuration, the computer housing includes the pointing device 767, keyboard 768 and the display 769 as is well known in the computer arts.

Figure 6:
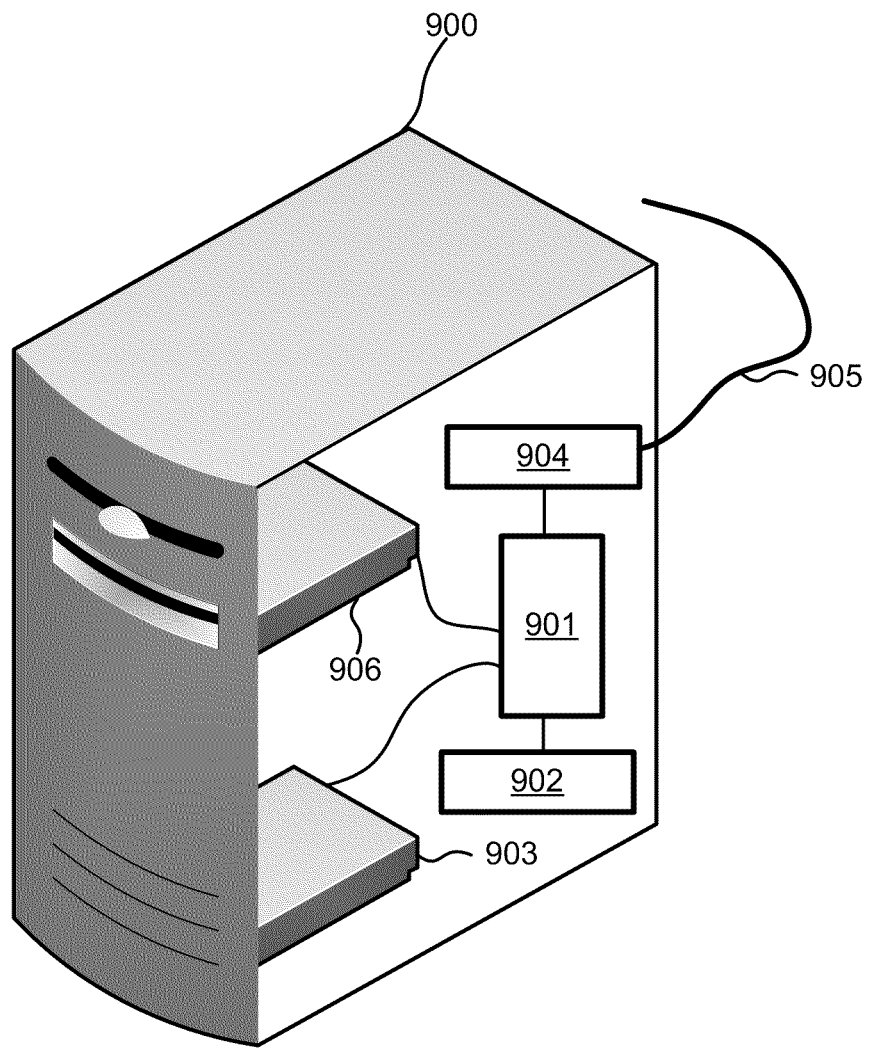
FIG. 6 is a component block diagram of a server device suitable for use in the various embodiments.

As used herein, a "server" encompasses a computing device that may be configured to interact in an automated fashion with other devices over a network to serve content and Web pages, to issue responses to communications from other network devices and to respond to queries from other network devices. A number of the aspects described herein may be implemented with any of a variety of remote server devices, such as the server 900 illustrated in FIG. 6. Such a server 900 typically includes a processor 901 coupled to volatile memory 902 and a large capacity nonvolatile memory, such as a disk drive 903. The server 900 may also include a floppy disk drive and/or a compact disc (CD) drive 906 coupled to the processor 901. The server 900 may also include a number of connector ports 904 coupled to the processor 901 for establishing data connections with network circuits 905.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A system for managing the delivery of targeted content, comprising:
    a do-not-target (DNT) repository server comprising a repository server processor;
    a network access device comprising a memory and a device processor coupled to the memory; and
    a Web server comprising a Web server processor,
    wherein the repository server processor is configured with processor-executable instructions to perform operations comprising:
        receiving a cookie request from the network access device for a DNT cookie; and
        sending the DNT cookie to the network access device via a network,
    wherein the device processor is configured with processor-executable instructions to perform operations comprising:
        receiving the DNT cookie from the DNT repository server;
        receiving an override cookie from the Web server;
        storing the received DNT cookie and the received override cookie in the memory;
        generating a page request for a Web page hosted on the Web server; and
        sending the page request to the Web server via the network, and
    wherein the Web server processor is configured with processor-executable instructions to perform operations comprising:

receiving the page request from the network access device;

accessing the memory of the network access device via the network to determine whether the memory stores the DNT cookie and the override cookie;

sending the Web page to the network access device without targeted content when it is determined that the memory stores the DNT cookie and not the override cookie;

sending the Web page to the network access device with targeted content when it is determined that the memory stores the DNT cookie and the override cookie; and sending the Web page to the network access device with targeted content when it is determined that the memory does not store the DNT cookie.

2. The system of claim 1, wherein the network access device is selected from the group consisting of a desktop computer, a laptop computer, a set top box, a smart phone, a PDA, and a WAP-enabled device.

3. The system of claim 1, wherein the network is the Internet.

4. The system of claim 1, wherein the memory is a memory device selected from the group consisting of a hard drive, a flash drive, and a memory stick.

5. The system of claim 1, wherein the targeted content comprises content selected based on a profile associated with a user.

6. The system of claim 1, wherein the targeted content comprises content selected based on a profile associated with the network access device.

7. The system of claim 1, wherein targeted content is classified by function selected from the group consisting of content provided to inform a user, content provided to acquire information from a user, content provided to engage in a financial transaction with a user, content provided to request a user to join a group and content provided to request a user to take an action.

8. The system of claim 1, wherein:

the Web server processor is configured with processor-executable instructions to perform operations further comprising receiving an override request from the network access device for a selected class of targeted content; and the Web server processor is configured with processor-executable instructions to perform operations such that sending the Web page to the network access device with targeted content when it is determined that the memory stores the DNT cookie and the override cookie comprises sending the Web page with the selected class of targeted content when it is determined that the memory stores the DNT cookie and the override cookie.

9. A method of managing the delivery of targeted content comprising:

receiving in a device processor of a network access device a do-not-target (DNT) cookie sent from a DNT repository;

receiving in the device processor an override cookie sent from a Web server;

storing the received DNT cookie and the received override cookie in a memory of the network access device;

generating in the device processor a request for a Web page hosted on the Web server;

sending the page request to the Web server via the network;

receiving the page request in a server processor of the Web server;

accessing the memory of the network access device from the Web server via the network to determine in the server processor whether the memory stores the DNT cookie and the override cookie;

sending the Web page without targeted content from the Web server to the network access device when it is determined that the memory stores the DNT cookie and not the override cookie;

sending the Web page with targeted content from the Web server to the network access device when it is determined that the memory stores the DNT cookie and the override cookie; and sending the Web page with targeted content from the Web server to the network access device when it is determined that the memory does not store the DNT cookie.

10. The method of claim 9, wherein the network access device is selected from the group consisting of a desktop computer, a laptop computer, a set top box, a smart phone, a PDA, and a WAP-enabled device.

11. The method of claim 9, wherein the network is the Internet.

12. The method of claim 9, wherein the memory is a memory device selected from the group consisting of a hard drive, a flash drive, and a memory stick.

13. The method of claim 9, wherein the targeted content comprises content selected based on a profile associated with a user.

14. The method of claim 9, wherein the targeted content comprises content selected based on a profile associated with the network access device.

15. The method of claim 9, wherein targeted content is classified by function selected from the group consisting of content provided to inform a user, content provided to acquire information from a user, content provided to engage in a financial transaction with a user, content provided to request a user to join a group and content provided to request a user to take an action.

16. The method of claim 9, further comprising:

receiving in the server processor an override request from the network access device for a selected class of targeted content, wherein sending the Web page with targeted content from the Web server to the network access device when it is determined that the memory stores the DNT cookie and the override cookie comprises sending the Web page with the selected class of targeted content to the network access device.

17. A system for managing the delivery of targeted content, comprising:

a network access device comprising a memory and a device processor coupled to the memory; and a Web server comprising a Web server processor, wherein the device processor is configured with processor-executable instructions to perform operations comprising:

receiving an override cookie from the Web server;

storing the override cookie in the memory;

generating a page request for a Web page hosted on the Web server; and sending the page request to the Web server via the network;

wherein the Web server processor is configured with processor-executable instructions to perform operations comprising:

receiving the page request from the network access device;

determining whether the received page request includes a do-not-target (DNT) header;
sending the Web page to the network access device without targeted content when it is determined that the received request does not include the DNT header;
accessing the memory of the network access device via the network to determine in the server processor whether the memory stores the override cookie; and
sending the Web page to the network access device with targeted content when it is determined that the received request includes the DNT header and that the memory stores the override cookie.

18. The system of claim 17, wherein the network access device is selected from the group consisting of a desktop computer, a laptop computer, a set top box, a smart phone, a PDA, and a WAP-enabled device.

19. The system of claim 17, wherein the network is the Internet.

20. The system of claim 17, wherein the targeted content comprises content selected based on a profile associated with a user.

21. The system of claim 17, wherein the targeted content comprises content selected based on a profile associated with the network access device.

22. The system of claim 17, wherein targeted content is classified by function selected from the group consisting of content provided to inform a user, content provided to acquire information from a user, content provided to engage in a financial transaction with a user, content provided to request a user to join a group and content provided to request a user to take an action.

23. The system of claim 17, wherein:
the Web server processor is configured with processor-executable instructions to perform operations further comprising receiving an override request from the network access device for a selected class of targeted content; and
the Web server processor is configured with processor-executable instructions to perform operations such that sending the Web page to the network access device with targeted content comprises:
sending the Web page with the selected class of targeted content to the network access device.

24. A method of managing the delivery of targeted content comprising:
receiving in a device processor of a network access device an override cookie from a Web server;
storing the override cookie in a memory of the network access device;
generating in the device processor a page request for a Web page hosted on the Web server;
sending the page request to the Web server via the network;
receiving the page request in a server processor of the Web server;
determining whether the received page request includes a do-not-target (DNT) header;
sending the Web page to the network access device without targeted content when it is determined that the received request does not include the DNT header;
accessing the memory of the network access device via the network to determine in the server processor whether the memory stores the override cookie; and
sending the Web page to the network access device with targeted content when it is determined that the received request includes the DNT header and that the memory stores the override cookie.

25. The method of claim 24, wherein the network access device is selected from the group consisting of a desktop computer, a laptop computer, a set top box, a smart phone, a PDA, and a WAP-enabled device.

26. The method of claim 24, wherein the network is the Internet.

27. The method of claim 24, wherein the memory is a memory device selected from the group consisting of a hard drive, a flash drive, and a memory stick.

28. The method of claim 24, wherein the targeted content comprises content selected based on a profile associated with a user.

29. The method of claim 24, wherein the targeted content comprises content selected based on a profile associated with the network access device.

30. The method of claim 24, wherein targeted content is classified by function selected from the group consisting of content provided to inform a user, content provided to acquire information from a user, content provided to engage in a financial transaction with a user, content provided to request a user to join a group and content provided to request a user to take an action.

31. The method of claim 24, further comprising:
receiving in the server processor an override request from the network access device for a selected class of targeted content,
wherein sending the Web page to the network access device with targeted content comprises sending the Web page with the selected class of targeted content to the network access device.

* * * * *

UNITED STATES PATENT AND TRADEMARK OFFICE
CERTIFICATE OF CORRECTION

| | | |
|---|---|---|
| PATENT NO. | : 8,412,814 B2 | Page 1 of 1 |
| APPLICATION NO. | : 12/718346 | |
| DATED | : April 2, 2013 | |
| INVENTOR(S) | : Howard Pfeffer, Peter Stern and Michael Dillion | |

It is certified that error appears in the above-identified patent and that said Letters Patent is hereby corrected as shown below:

On the Title Page

Item (73) Assignee

Please delete "Time Warner Cable, Inc." and insert --Time Warner Cable Enterprises LLC--

Signed and Sealed this
Twenty-first Day of April, 2015

Michelle K. Lee
*Director of the United States Patent and Trademark Office*